(12) United States Patent
Beattie et al.

(10) Patent No.: US 8,109,765 B2
(45) Date of Patent: Feb. 7, 2012

(54) INTELLIGENT TUTORING FEEDBACK

(75) Inventors: Valerie L. Beattie, Macungie, PA (US); Marilyn Jager Adams, Belmont, MA (US); Michael Barrow, Wayland, MA (US)

(73) Assignee: Scientific Learning Corporation, Oakland, CA (US)

( * ) Notice: Subject to any disclaimer, the term of this patent is extended or adjusted under 35 U.S.C. 154(b) by 820 days.

(21) Appl. No.: 10/938,746

(22) Filed: Sep. 10, 2004

(65) Prior Publication Data

US 2006/0069561 A1    Mar. 30, 2006

(51) Int. Cl.
*G09B 19/00* (2006.01)
*G09B 19/04* (2006.01)
*G09B 5/00* (2006.01)
*G10L 15/00* (2006.01)

(52) U.S. Cl. ........ 434/178; 434/156; 434/179; 434/185; 434/319; 704/200; 704/231

(58) Field of Classification Search ............ 434/156, 434/167, 170, 178, 179, 185, 308, 319, 322; 704/246, 1, 200, 231
See application file for complete search history.

(56) References Cited

U.S. PATENT DOCUMENTS

| | | | | |
|---|---|---|---|---|
| 5,634,086 A * | 5/1997 | Rtischev et al. | | 704/270 |
| 5,730,603 A * | 3/1998 | Harless | | 434/308 |
| 5,870,709 A | 2/1999 | Bernstein | | |
| 5,875,428 A | 2/1999 | Kurzweil et al. | | |
| 5,885,083 A * | 3/1999 | Ferrell | | 434/156 |
| 5,920,838 A * | 7/1999 | Mostow et al. | | 704/255 |
| 5,999,903 A | 12/1999 | Dionne et al. | | |
| 6,014,464 A | 1/2000 | Kurzweil et al. | | |
| 6,017,219 A | 1/2000 | Adams, Jr. et al. | | |
| 6,033,224 A | 3/2000 | Kurzweil et al. | | |
| 6,052,663 A | 4/2000 | Kurzweil et al. | | |
| 6,055,498 A * | 4/2000 | Neumeyer et al. | | 704/246 |
| 6,068,487 A | 5/2000 | Dionne | | |
| 6,077,085 A * | 6/2000 | Parry et al. | | 434/322 |
| 6,120,297 A | 9/2000 | Morse, III et al. | | 434/169 |
| 6,137,906 A | 10/2000 | Dionne | | |
| 6,157,913 A | 12/2000 | Bernstein | | |
| 6,188,779 B1 | 2/2001 | Baum | | |
| 6,199,042 B1 | 3/2001 | Kurzweil | | |
| 6,246,791 B1 | 6/2001 | Kurzweil et al. | | |
| 6,256,610 B1 | 7/2001 | Baum | | |
| 6,302,695 B1 * | 10/2001 | Rtischev et al. | | 434/157 |
| 6,305,942 B1 * | 10/2001 | Block et al. | | 434/156 |
| 6,320,982 B1 | 11/2001 | Kurzweil et al. | | |
| 6,419,496 B1 * | 7/2002 | Vaughan, Jr. | | 434/322 |
| 6,435,876 B1 | 8/2002 | Chen | | |
| 6,474,992 B2 * | 11/2002 | Marshall | | 434/167 |
| 6,634,887 B1 | 10/2003 | Heffernan, III et al. | | |
| 7,062,220 B2 * | 6/2006 | Haynes et al. | | 434/353 |
| 7,153,139 B2 * | 12/2006 | Wen et al. | | 434/156 |
| 7,433,819 B2 * | 10/2008 | Adams et al. | | 704/251 |
| 2002/0086268 A1 * | 7/2002 | Shpiro | | 434/156 |
| 2004/0023191 A1 * | 2/2004 | Brown et al. | | 434/156 |
| 2004/0152054 A1 * | 8/2004 | Gleissner et al. | | 434/156 |
| 2004/0234938 A1 | 11/2004 | Woolf et al. | | |
| 2005/0010952 A1 * | 1/2005 | Gleissner et al. | | 725/46 |
| 2005/0053900 A1 * | 3/2005 | Kaufmann | | 434/169 |

OTHER PUBLICATIONS

Notification of Transmittal of The International Search Report and The Written Opinion of the International Searching Authority, or the Declaration, Jul. 28, 2008, 15 pages.

(Continued)

*Primary Examiner* — Kang Hu
(74) *Attorney, Agent, or Firm* — Fish & Richardson P.C.

(57) ABSTRACT

Methods and related computer program products, systems, and devices for providing intelligent feedback to a user based on audio input associated with a user reading a passage are disclosed. The method can include assessing a level of fluency of a user's reading of the sequence of words using speech recognition technology to compare the audio input with an expected sequence of words and providing feedback to the user related to the level of fluency for a word.

29 Claims, 15 Drawing Sheets

OTHER PUBLICATIONS

Fairweather et al., "Overcoming Technical Barriers to a Speech-enabled Children's Reading Tutor," retrieved from http://www.research.ibm.com/AppliedLearningSciWeb/Fairweather/techbar.pdf, IBM T.J. Watson Research Center, Yorktown heights, NY, 12 pages, downloaded on Aug. 9, 2011.

Banerjee et al., "Evaluating the Effect of Predicting Oral Reading Miscues" Project LISTEN; retrieved from http://www-2.cs.cmu.edu/~ listen/pdfs/Eurospeech2003_Evaluating_predicted_mis, 4 pages, conference dated Sep. 1-3, 2003, paper downloaded on Aug. 9, 2011.

Mostow et al. "A Prototype Reading Coach that Listens" Proceedings of the Twelfth National Conference on Artificial Intelligence (AAAI-94), Aug. 1994; retrieved from http://www-2.cs.cmu.edu/%7Elisten/pdfs/aaai94_online.pdf, 9 pages, downloaded on Aug. 9, 2011.

* cited by examiner

FIG. 3

| a | an | am | and | are | as | at |
| --- | --- | --- | --- | --- | --- | --- |
| be | by | but | can | did | do | for |
| from | get | go | had | has | have | he |
| her | him | his | I | in | into | is |
| it | its | it's | may | me | my | no |
| not | of | on | or | our | out | she |
| so | that | their | them | the | then | they |
| this | to | too | the | up | us | was |
| we | were | what | who | with | when | whose |
| yes | you | your | | | | |

FIG. 11

INTELLIGENT TUTORING FEEDBACK

BACKGROUND

Reading software tends to focus on reading skills other than reading fluency. A few reading software products claim to provide benefit for developing reading fluency. One component in developing reading fluency is developing rapid and correct recognition and pronunciation of words included in a passage.

SUMMARY

According to an aspect of the present invention, a computer-based method includes receiving audio input associated with a user reading a sequence of words displayed on a graphical user interface. The method also includes assessing a level of fluency and pronunciation accuracy of a user's reading of the sequence of words using speech recognition technology to compare the audio input with an expected sequence of words. The method includes providing feedback to the user related to the level of fluency and pronunciation accuracy for a word. The feedback can include immediate feedback if the level of fluency and pronunciation accuracy for a word does not meet a first set of criteria. The feedback can further include additional, deferred feedback to the user if immediate feedback was given for the word, depending on the type of immediate feedback given, the category of the word, and other criteria. The feedback can further include deferred feedback to the user if the level of fluency and pronunciation accuracy for a word meets the first set of criteria, but does not meet a second set of fluency and pronunciation accuracy criteria. A user can therefore receive only immediate feedback, only deferred feedback, or both immediate and deferred feedback for a word based on the fluency and pronunciation accuracy criteria.

Embodiments can include one or more of the following.

Providing immediate feedback can include providing an intervention if a specified time period since the start of the audio input associated with a sequence of words has elapsed, and the speech recognition process has not identified the first word in the sequence. Providing immediate feedback can include providing an intervention if a specified time period since identifying the previous word in the sequence of words has elapsed and the speech recognition process has not identified the word. Providing deferred feedback can include placing the word on a review list and/or coloring the text of the word. Providing deferred feedback to the user can include representing the user's pronunciation of a word by an acoustic match confidence level and providing feedback if the acoustic match confidence level is below a specified target level. Providing deferred feedback to the user can include providing feedback based on the elapsed time before, during, and/or after the audio identified as a word. The criteria for providing immediate and deferred feedback for a word can be dependent on a word category associated with the word.

The interactive feedback can include a visual intervention such as a visual indication provided on the graphical user interface. The interactive feedback can include an audio intervention such as an audio indication. The visual indication can include highlighting the word on the user interface. The visual indication can include coloring the text prior to the word in the passage in a first color and coloring the word and text subsequent to the word in the sentence in a second color. The audio indication can include a pronunciation of the word.

A visual intervention can be provided based on the user's first attempt to read a word and an audio intervention can be provided based on the user's second attempt to read the word.

The method can also include providing the user a third opportunity to read the word subsequent to the audio intervention and providing a visual indication on the graphical user interface to indicate that the user should continue reading with the subsequent word if the fluency or pronunciation accuracy criteria are not met. The deferred feedback can include coloring the sequence of words read by the user using different colors on the graphical user interface. The method can also include providing a color based indication for words which met both sets of criteria using a first color, providing a color-based indication for words which received an audio intervention using a second color, and providing a color-based indication for words which did not receive an audio intervention and did not meet the deferred feedback criteria using a third color. In addition, the method can include providing a color-based indication for words which received a visual intervention using the third color. Providing additional, deferred feedback can include placing words on a review list. Words which received an audio intervention and/or a visual intervention can be placed on a review list. The method can also include generating review exercises, which may be interactive or non-interactive, for the user based on the review list.

According to an additional aspect of the present invention, a computer program product residing on a computer readable medium can include instructions for causing an electrical device to receive audio input associated with a user reading a sequence of words displayed on a graphical user interface. The computer program product can also include instructions assess a level of fluency and pronunciation accuracy of a user's reading of the sequence of words using speech recognition technology to compare the audio input with an expected sequence of words. The computer program product can also include instructions provide feedback to the user related to the level of fluency and pronunciation accuracy for a word. The feedback can include instructions to provide immediate feedback if the level of fluency and pronunciation accuracy for a word does not meet a first set of criteria, instructions to provide deferred feedback to the user if the level of fluency and pronunciation accuracy for a word meets the first set of criteria, but does not meet a second set of fluency and pronunciation accuracy criteria, and instructions to provide deferred feedback to the user if immediate feedback was given for the word, depending on the word's category and type of immediate feedback given.

Embodiments can include one or more of the following.

The computer program product can include instructions for causing an electrical device to represent the user's pronunciation of a word by an acoustic match confidence level; and provide feedback if the acoustic match confidence level is below a specified target level. The immediate feedback can be a visual intervention which includes visual indications provided on the graphical user interface, and which does not include audio indications. The computer program product can include instructions for causing an electrical device to color the text prior to the word in the passage in a first color and color the word and text subsequent to the word in the sentence in a second color, the first color being different from the second color.

The visual intervention is provided based on the user's first attempt to read a word and the audio intervention is provided based on the user's second attempt to read the word. The computer program product of claim 20 further comprising instructions for causing an electrical device to provide a color based indication for words which met both sets of fluency and pronunciation accuracy criteria using a first color, provide a color based indication for words which received an audio intervention using a second color, and provide a color based indication for words which did not receive an audio intervention and did not meet the second set of fluency and pronunciation accuracy criteria using a third color.

Words which received an audio intervention can be placed on a review list. Words which received a visual intervention are placed on a review list.

In another embodiment, a device can be configured to receive audio input associated with a user reading a sequence of words displayed on a graphical user interface, assess a level of fluency and pronunciation accuracy of a user's reading of the sequence of words using speech recognition technology to compare the audio input with an expected sequence of words; and provide feedback to the user related to the level of fluency and pronunciation accuracy for a word. The device can be configured such that the feedback can include configurations to provide immediate feedback if the level of fluency and pronunciation accuracy for a word does not meet a first set of criteria, provide deferred feedback to the user if the level of fluency and pronunciation accuracy for a word meets the first set of criteria, but does not meet a second set of fluency and pronunciation accuracy criteria, and provide deferred feedback to the user if immediate feedback was given for the word, depending on the word's category and type of immediate feedback given.

The device can also be configured to represent the user's pronunciation of a word by an acoustic match confidence level; and provide feedback if the acoustic match confidence level is below a specified target level. The device can also be configured to color the text prior to the word in the passage in a first color and color the word and text subsequent to the word in the sentence in a second color, the first color being different from the second color. The device can also be configured to provide a color based indication for words which met both sets of fluency and pronunciation accuracy criteria using a first color, provide a color based indication for words which received an audio intervention using a second color, and provide a color based indication for words which did not receive an audio intervention and did not meet the second set of fluency and pronunciation accuracy criteria using a third color. The device can also be configured to place words on a review list based on an audio or visual intervention. The device can also be configured to generate review exercises for the user based on the review list.

The details of one or more embodiments of the invention are set forth in the accompanying drawings and the description below. Other features, objects, and advantages of the invention will be apparent from the description and drawings, and from the claims.

DESCRIPTION OF DRAWINGS

Figure 3:
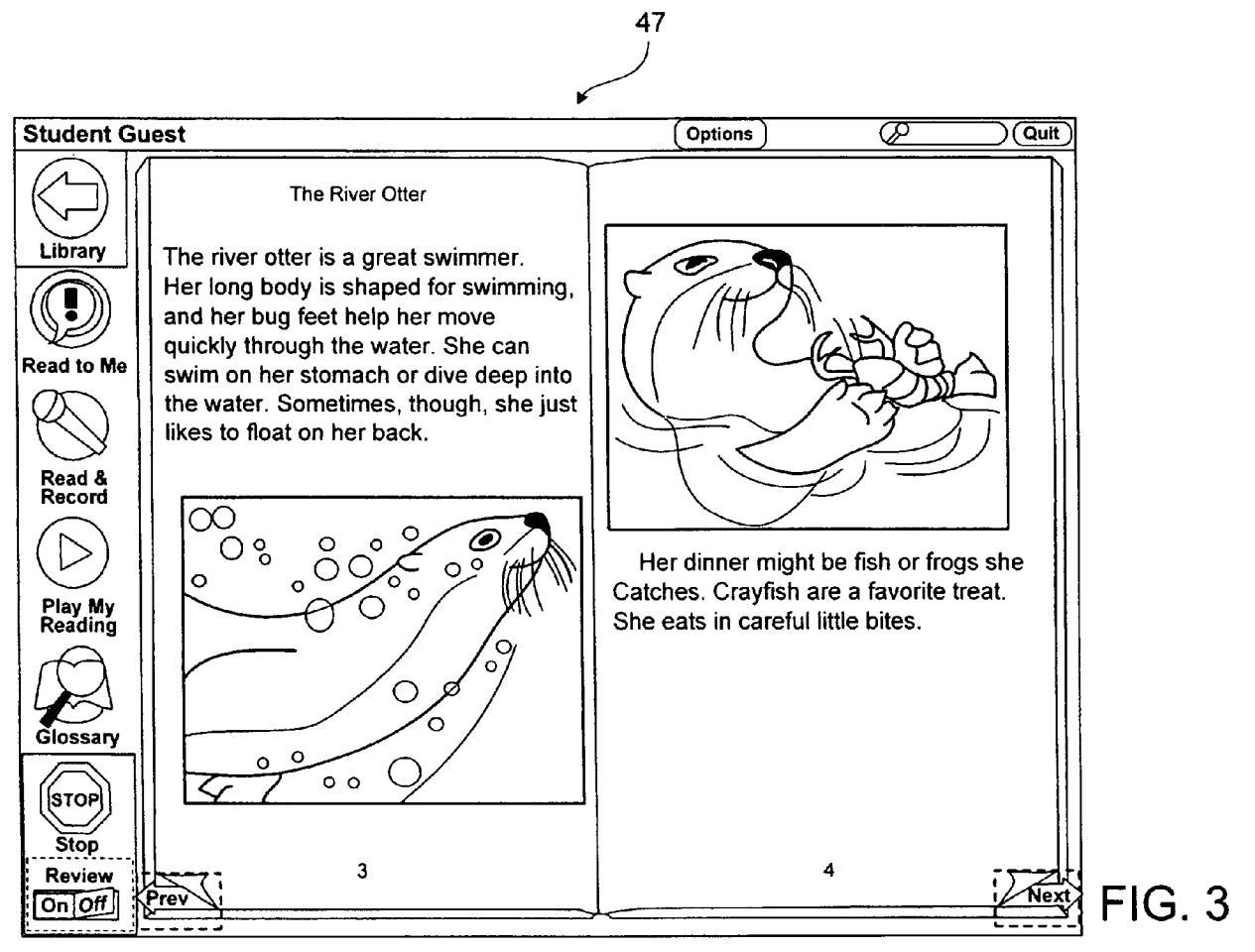

FIG. 3 is a screenshot of a passage for use with the reading tutor software.

FIG. 11 is a table of exemplary glue words.

DETAILED DESCRIPTION

Figure 1:
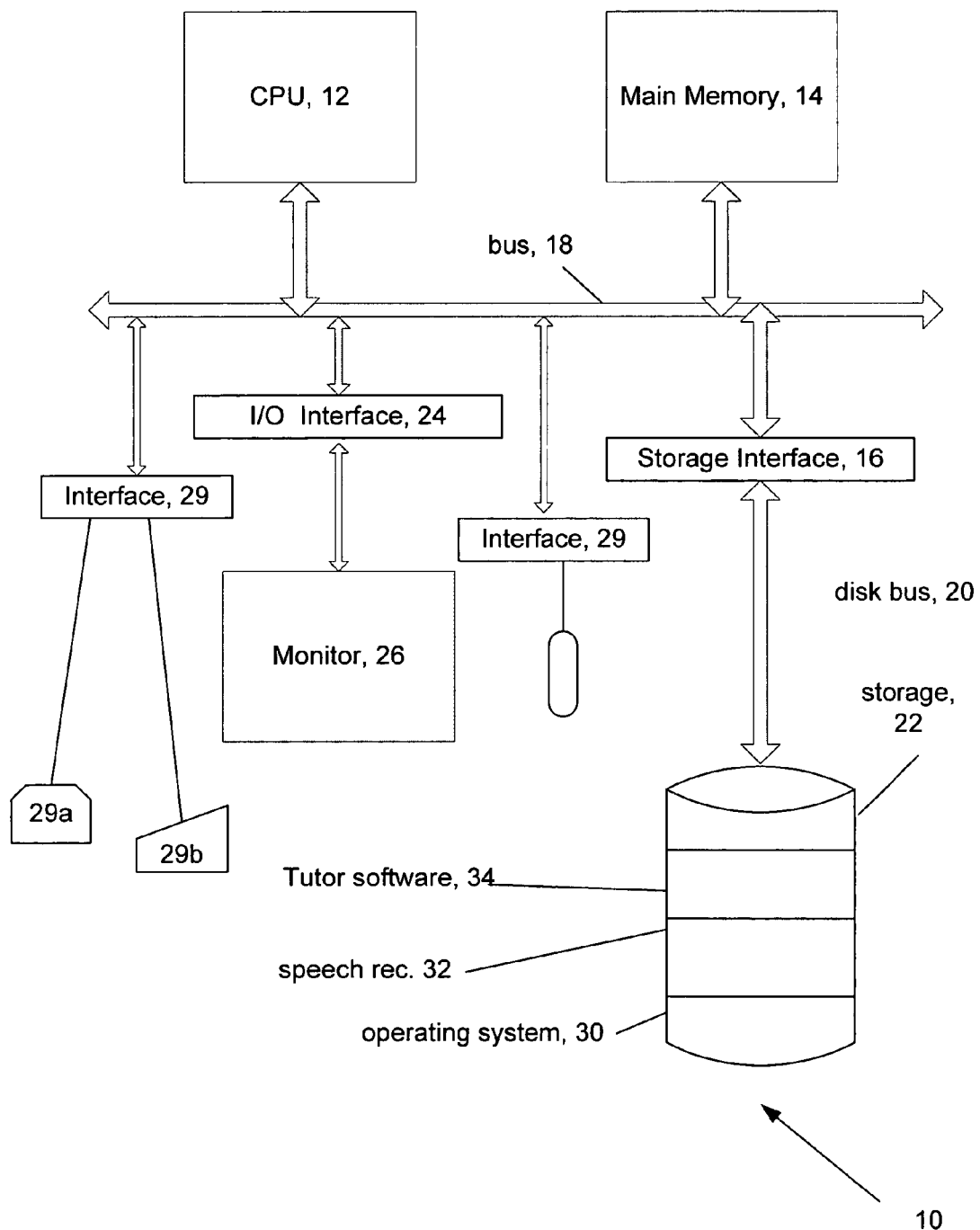
FIG. 1 is a block diagram of a computer system adapted for reading tutoring.
Figure 2:
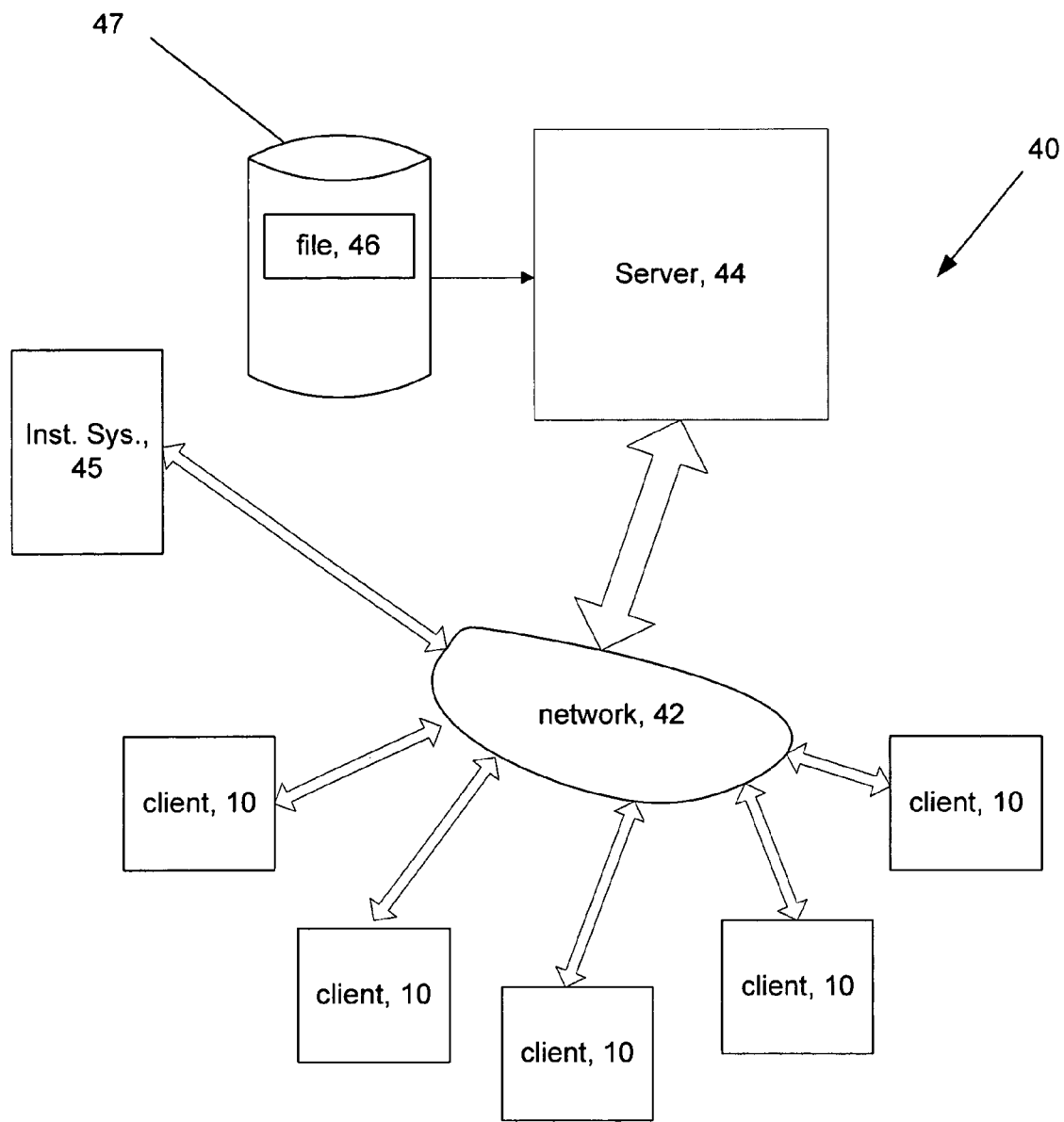
FIG. 2 is a block diagram of a network of computer systems.
Figure 4:
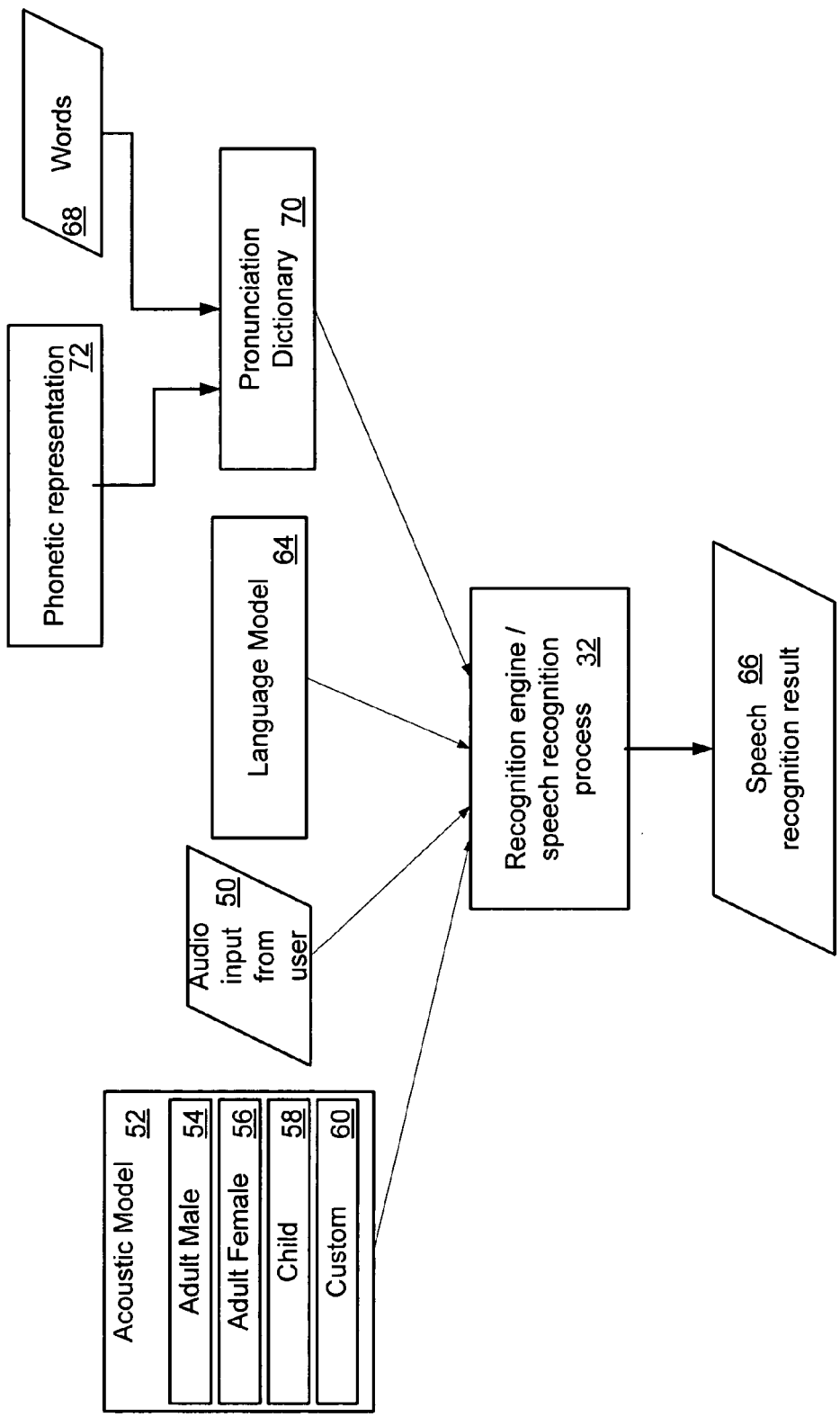
FIG. 4 is a block diagram of inputs and outputs to and from the speech recognition engine or speech recognition process.
Figure 5:
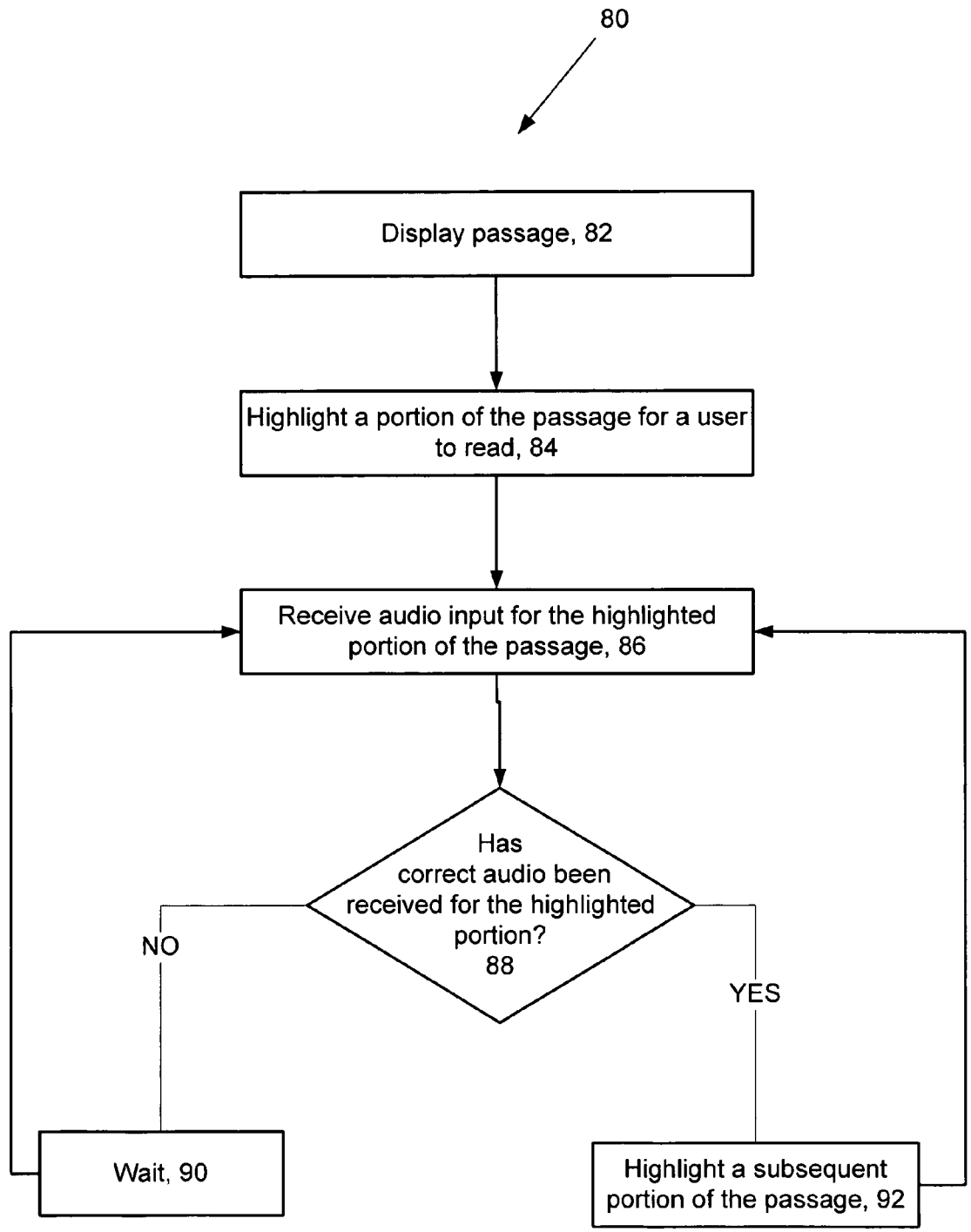
FIG. 5 is a flow chart of a location tracking process.

Referring to FIG. 1, a computer system 10 includes a processor 12, main memory 14, and storage interface 16 all coupled via a system bus 18. The interface 16 interfaces system bus 18 with a disk or storage bus 20 and couples a disk or storage media 22 to the computer system 10. The computer system 10 would also include an optical disc drive or the like coupled to the bus via another interface (not shown). Similarly, an interface 24 couples a monitor or display device 26 to the system 10. Other arrangements of system 10, of course, could be used and generally, system 10 represents the configuration of any typical personal computer. Disk 22 has stored thereon software for execution by a processor 12 using memory 14. Additionally, an interface 29 couples user devices such as a mouse 29a and a microphone/headset 29b, and can include a keyboard (not shown) to the bus 18.

The software includes an operating system 30 that can be any operating system, speech recognition software 32 which can be an open source recognition engine or any engine that provides sufficient access to recognizer functionality, and tutoring In some embodiments, the highlighting can shift as the user progresses in addition to changing or updating the highlighting or visual indication after the recognition of the completion of the sentence. For example, when the user reaches a predetermined transition point within one sentence the visual indication may be switched off for the completed part of that sentence and some or all of the following sentence may be indicated.

As described above, the location of a student's reading within the passage is visually indicated to the user on a sentence-by-sentence basis. However, the system tracks where the user is on a word-by-word basis. The location is tracked on a word-by-word basis to allow the generation of interventions. In general, interventions are processes by which the application assists a user when the user is struggling with a particular word in a passage. It also tracks on a word-by-word basis so as to allow evaluation, monitoring and record-keeping of reading accuracy and fluency, and to generate reports to students and teachers about same.

Figure 6:
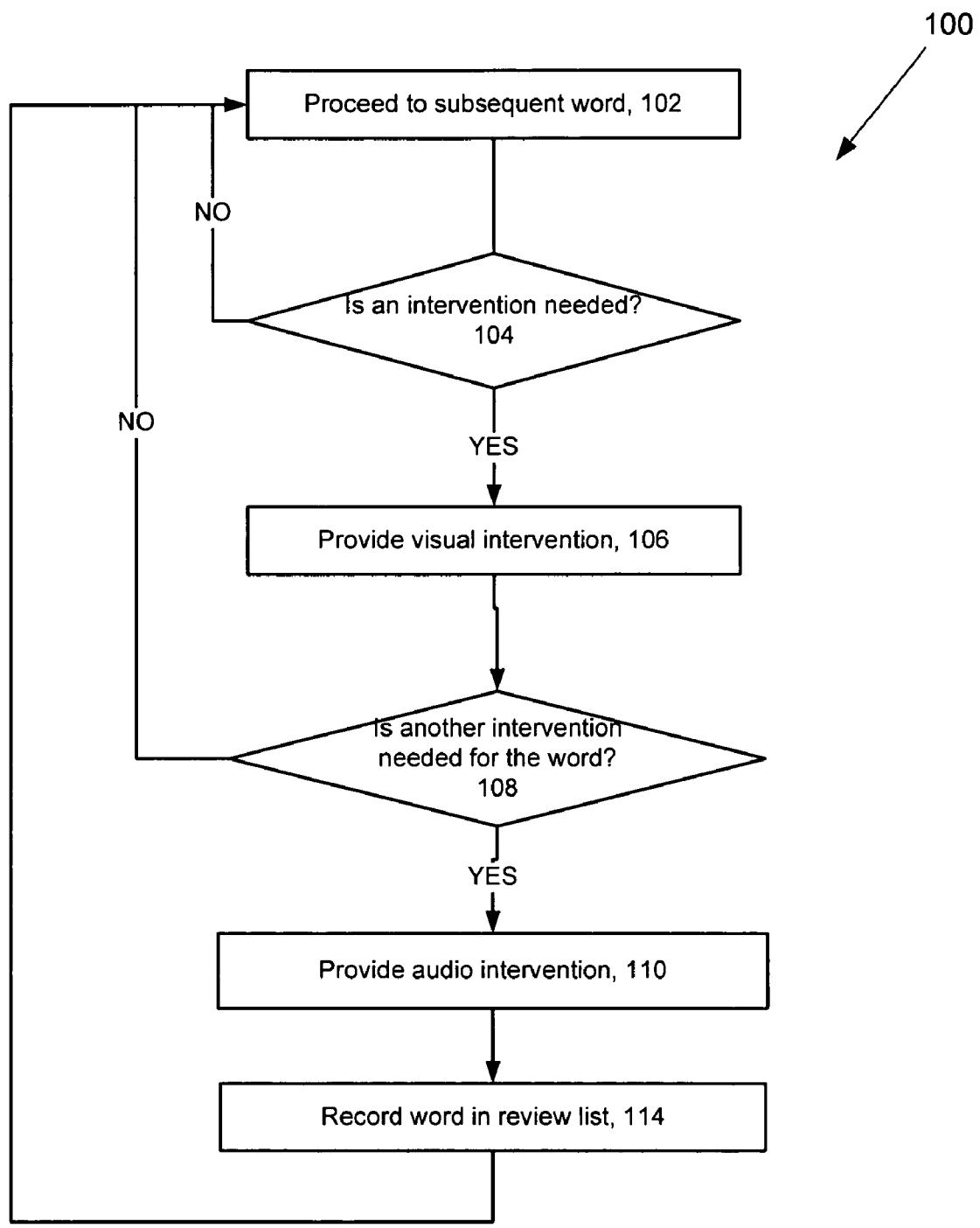
FIG. 6 is a flow chart of visual and audio interventions.

The tutor software 34 provides multiple levels of interventions, for example, the software can include a visual intervention state and audio intervention state, as shown in FIG. 6. When the tutor software 34 does not receive a valid recognition on an expected word after a specified duration has elapsed, the tutor software 34 intervenes 106 by applying a visual indication to the expected word. For example, a yellow or other highlight color may be applied over the word. Words in the current sentence that are before the expected word may also be turned from black to gray to enable the user to quickly identify where he/she should be reading. The user is given a chance to self-correct or re-read the word. The unobtrusive nature of the visual intervention serves as a warning to the student without causing a significant break in fluent reading. If the tutor software 34 still fails 108 to receive an acceptable recognition of the word, an audio intervention takes place 110. A recording or a synthesized version of the word plays with the correct pronunciation of the word and the word is placed 114 on a review list. Alternatively, a recording indicating "read from here" may be played, particularly if the word category 190 indicates that the word is a short common word that the user is likely to know. In this case, the user is likely struggling with a subsequent, more difficult word or is engaged in extraneous vocalization, so likewise the software may not place the word on a review list depending on the word category (e.g. if the word is a glue word 194). The tutor software 34 gives the student the opportunity to re-read the word correctly and continue with the current sentence. The tutor software 34 determines if a valid recognition for the word has been received and if so, proceeds 102 to a subsequent word, e.g., next word. If a valid recognition is not received, the software will proceed to the subsequent word after a specified amount of time has elapsed.

As described above, the reading tutor software 34 provides visual feedback to the user on a sentence-by-sentence basis as the user is reading the text (e.g. the sentence s/he is currently reading will be black and the surrounding text will be gray). This user interface approach minimizes distraction to the user compared to providing feedback on a word-by-word basis (e.g., having words turn from black to gray as s/he is recognized). With the sentence-by-sentence feedback approach, however, it can be desirable to non-disruptively inform the user of the exact word (as opposed to sentence) where the tutor software expects the user to be reading. The software may need to resynchronize with the user due to several reasons. For example, the user may have read a word but stumbled or slurred the word and the word was not recognized, the application may have simply misrecognized a word, the user may have lost his/her place in the sentence, the user may have said something other than the word, and the like. It can be preferable to provide an intervention to help to correct such errors, but a full intervention that plays the audio for the word and marks the word as incorrect and puts the word on the review list may not be necessary. Thus, a visual intervention allows the user or the application to get back in synchronization without the interruption, distraction, and/or penalty of a full intervention on the word.

As described above, there will be a time gap from the time that a valid recognition is received for one (previous) word, during which a valid recognition for the expected (next) word has not yet been received. If there is no relevant previous word, there will be a time gap from the time the current utterance (i.e. audio file or audio buffer) was initiated, during which the expected word has not yet been received. This time gap can become significant or large for a number of reasons, e.g. a user may pause during the reading of a passage because s/he does not know the expected word, the user may mispronounce or skip the expected word, or the recognition engine may not correctly identify the expected word in the audio stream. The tutor software 34 can provide an intervention based on the length of time elapsed since the previous word, or since the start of the audio buffer or file, during which the tutor software 34 has not yet received a valid recognition for the expected word.

Figure 7A:
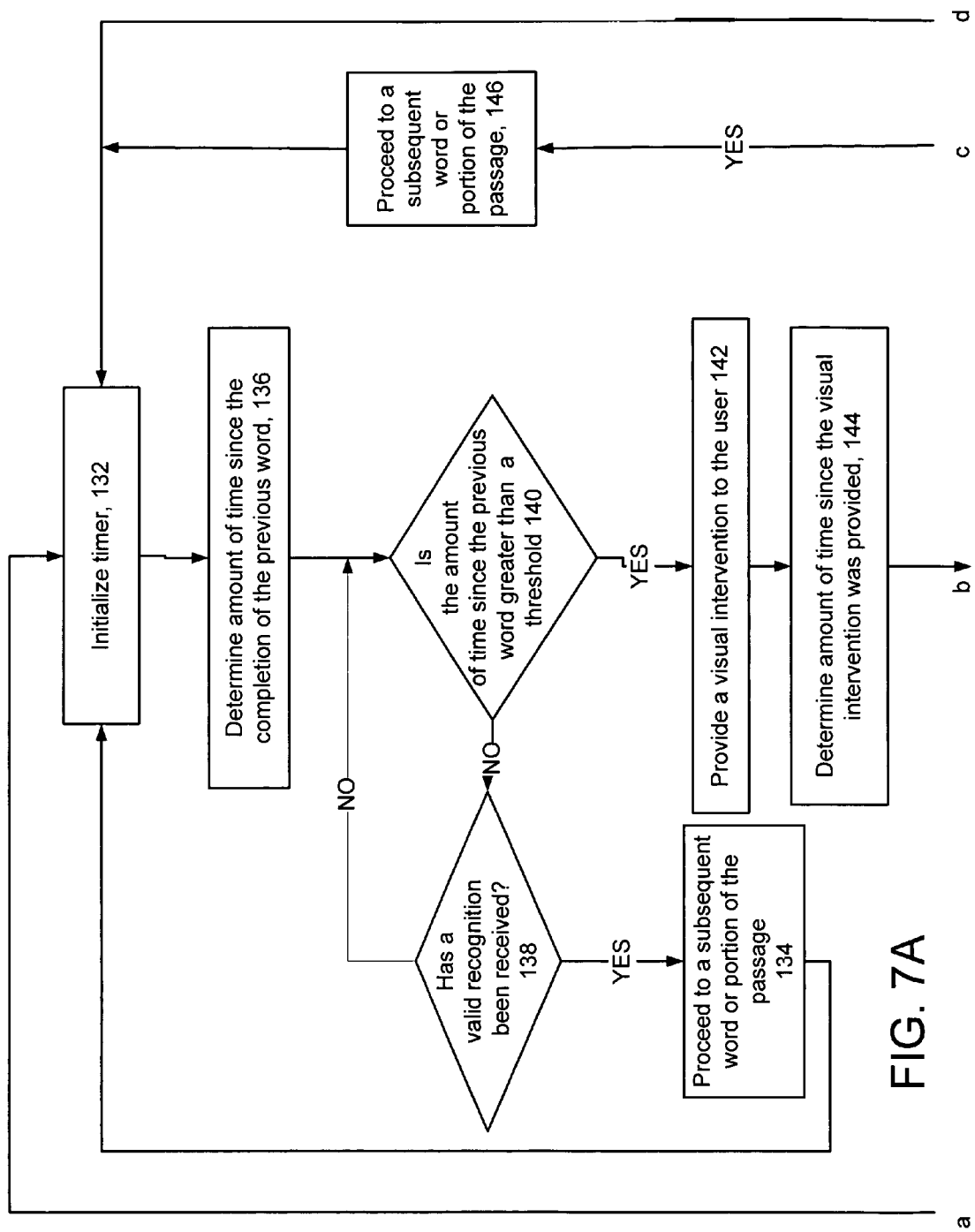
FIGS. 7A and 7B are portions of a flow chart of an intervention process based on elapsed time.
Figure 7B:
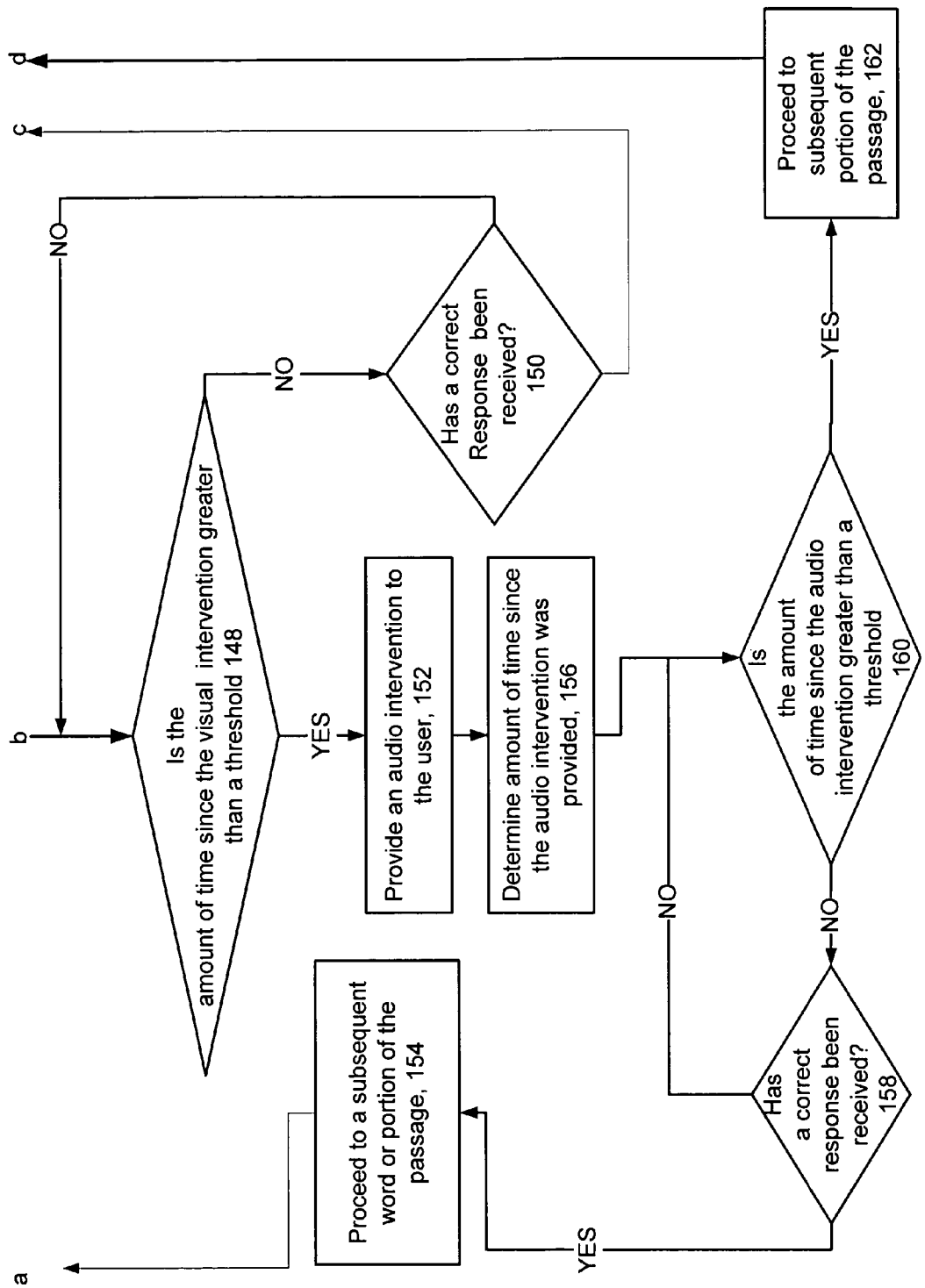

Referring to FIG. 7, a process 130 for determining an intervention based on an elapsed amount of time or a pause is shown. Process 130 includes initializing 132 a timer, e.g., a software timer or a hardware timer can be used. The timer can be initialized based on the start of a silence (no voice input) period, the start of a new audio buffer or file, the completion of a previous word, or another audio indication. The timer determines 136 a length of time elapsed since the start of the timer. Process 130 determines 140 if the amount of time on the timer since the previous word is greater than a threshold. If the time is not greater than the threshold, process 130 determines 138 if valid recognition has been received. If a valid recognition has not been received, process 130 returns to determining the amount of time that has passed. This loop is repeated until either a valid recognition is received or the time exceeds the threshold. If a valid recognition is received (in response to determination 138), process 130 proceeds 134 to a subsequent word in the passage and re-initializes 132 the timer. If the time exceeds the threshold, process 130 provides 142 a first/visual intervention. For example, the tutor software highlights the word, changes the color of the word, underlines the word, etc.

After providing the visual intervention, process 130 determines 144 an amount of time since the intervention or a total time. Similar to the portion of the process above, process 130 determines 148 if the amount of time on the timer is greater than a threshold. This threshold may be the same or different than the threshold used to determine if a visual intervention is needed. If the time is not greater than the threshold, process 130 determines 150 if a valid recognition has been received. If input has not been received, process 130 returns to determining 148 the amount of time that has passed. This loop is repeated until either a valid recognition is received or the time exceeds the threshold. If a valid recognition is received (in response to determination 148), process 130 proceeds 146 to a subsequent word in the passage and re-initializes 132 the timer. If the time exceeds the threshold, process 130 provides 152 an audio intervention.

After providing the audio intervention, process 130 determines 156 an amount of time since the intervention or a total time and determines 148 if the amount of time is greater than a threshold (e.g., a third threshold). This threshold may be the same or different from the threshold used to determine if a visual intervention or audio intervention is needed. If the time is not greater than the threshold, process 130 determines 158 if a valid recognition has been received. If input has not been received, process 130 returns to determining 160 the amount of time that has passed. This loop is repeated until either a valid recognition is received or the time exceeds the threshold. If a valid recognition is received (in response to determination 160), process 130 proceeds 154 to a subsequent word in the passage and re-initializes 132 the timer. If the time exceeds the threshold, process 130 proceeds 162 to a subsequent word in the passage, but the word is indicated as not receiving a correct response within the allowable time period.

Figure 8:
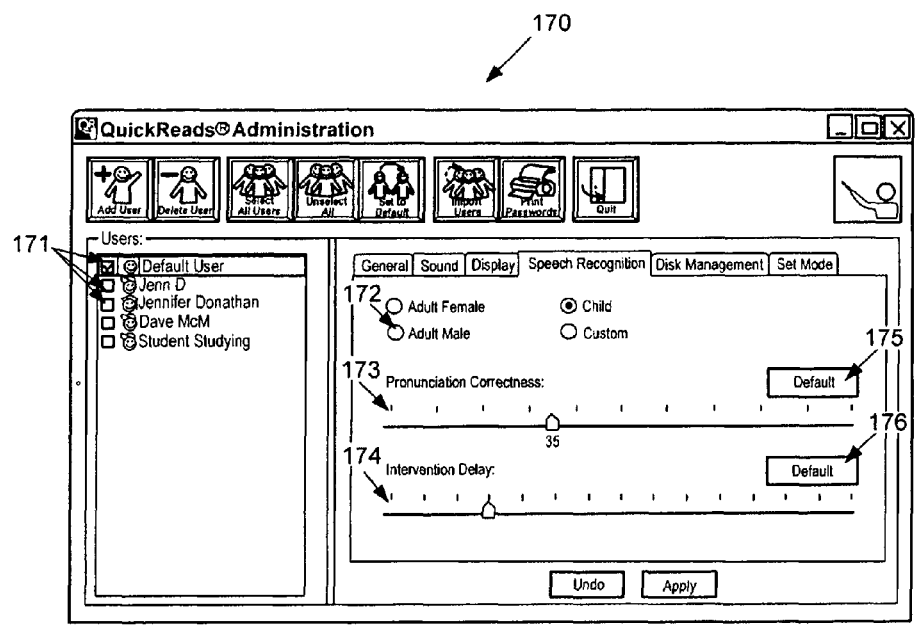
FIG. 8 is a screenshot of a set up screen for the tutor software.

In some embodiments, the visual intervention state and the full audio intervention state are used in combination. A visual intervention is triggered after a time-period has elapsed in which the tutor software 34 does not recognize a new sentence word. The "visual intervention interval" time period can be about 1-3 seconds, e.g., 2 seconds as used in the example below. However, the interval can be changed in the application's configuration settings (as shown in FIG. 8). For example, if the sentence is "The cat sat" and the tutor software 34 receives a recognition for the word "The", e.g., 0.9 seconds from the time the user starts the sentence, no intervention will be triggered for the word "The" since the time before receiving the input is less than the set time period. However, if 2.0 seconds elapses from the time the software received a recognition for "The", during which the tutor software does not receive a recognition for the word "cat" the tutor software 34 triggers a visual intervention on the word "cat'" (the first sentence word that has not been recognized). For the visual intervention, words in the current sentence which are prior to the intervened word are colored gray. The word that triggered the visual intervention (e.g. cat) is colored black and additionally has a colored (e.g., yellow) oval "highlight" overlaid over the word. The remainder of the sentence is black. Other visual representations could, however, be used.

From the point of view of speech recognition, a new recording (starting with "cat") starts with the visually intervened word and the tutor software re-synchronizes the recognition context (language model) so that the recognizer expects an utterance beginning with the intervened word.

If the user reads the word that has received visual intervention successfully before the audio intervention is triggered, the intervened word is coded, e.g., green, or correct unless the word is a member of a certain word category. For example if the word is a target word, it can be coded in a different color, and/or placed on a review list, indicating that the word warrants review even though it did not receive a full audio intervention. If the user does not read the word successfully, a full audio intervention will be triggered after a time period has elapsed. This time period is equal to the Intervention Interval (set on a slider in the application, e.g., as shown in FIG. 8) minus the visual intervention interval. The time periods before the visual intervention and between the visual intervention and the full intervention would be a minimum of about 1-5 seconds so that these events do not trigger before the user has been given a chance to say a complete word. The optimum time period settings will depend upon factors including the reading level of the text, the word category, and the reading level, age, and reading rate of the user. If the Intervention Interval is set too low (i.e. at a value which is less than the sum of the minimum time period before the visual intervention, and the minimum time period between the visual intervention and the full intervention), the visual intervention state will not be used and the first intervention will be an audio intervention.

Referring to FIG. 8, a screenshot 170 of a user interface for setting speech recognition characteristics for the tutor software 34 is shown. The speech recognition screen 170 allows a user or administrator to select a particular user (e.g., using selection boxes 171) and set speech recognition characteristics for the user. The user or administrator can select an acoustic model by choosing between acoustic models included in the system by selecting one of the acoustic model boxes 172. In addition, the user can select a level of pronunciation correctness using pronunciation correctness continuum or slider 173. The use of a pronunciation correctness slider 173 allows the level of accuracy in pronunciation to be adjusted according to the skill level of the user. In addition, the user can select an intervention delay using intervention delay slider 174. The intervention delay slider 174 allows a user to select an amount of time allowed before an intervention is generated.

As described above, speech recognition is used for tracking where the user is reading in the text. Based on the location in the text, the tutor software 34 provides a visual indication of the location within the passage where the user should be reading. In addition, the speech recognition can be used in combination with the determination of interventions to assess at what rate the user is reading and to assess if the user is having problems reading a word. In order to maximize speech recognition performance, the tutor software dynamically defines a "recognition configuration" for each utterance (i.e. audio file or buffer that is processed by the recognizer).

A new utterance will be started when the user starts a new sentence or after a visual intervention or audio intervention. The recognition configuration includes the set of items that can be recognized for that utterance, as well as the relative weighting of these items in the recognizer's search process. The search process may include a comparison of the audio to acoustic models for all items in the currently active set. The set of items that can be recognized may include expected words, for example, the words in the current sentence, words in the previous sentence, words in the subsequent sentence, or words in other sentences in the text. The set of items that can be recognized may also include word competition models. Word competition models are sequences of phonemes derived from the word pronunciation but with one or more phonemes omitted, or common mispronunciations or misreadings of words. The set of recognized sounds include phoneme fillers representing individual speech sounds, noise fillers representing filled pauses (e.g. "um") and non-speech sounds (e.g. breath noise).

For some recognition items in the active set, for example phoneme fillers, the relative weighting of these items is independent of prior context (independent of what has already been recognized in the current utterance, and of where the user started in the text). For other items, the relative weighting of items is context-dependent, i.e. dependent on what was recognized previously in the utterance and/or on where the user was in the text when the utterance started.

The context-dependent weighting of recognition items is accomplished through language models. The language models define the words and competition models that can be recognized in the current utterance, and the preferred (more highly weighted) orderings of these items, in the recognition sequence. Similar to a statistical language model that would be used in large-vocabulary speech recognition, the language model 64 defines the items (unigrams—a single word), ordered pairs of items (bigrams—a two word sequence), and ordered triplets of items (trigrams—a three word sequence) to be used by the recognition search process. It also defines the relative weights of the unigrams, bigrams, and trigrams which is used in the recognition search process. Additionally, the language model defines the weights to be applied when recognizing a sequence (bigram or trigram) that is not explicitly in the language model. However, unlike a statistical language model, the language model 64 is not based on statistics derived from large amounts of text. Instead it is based on the sequence of words in the text and on patterns of deviation from the text that are common among readers.

Figure 9:
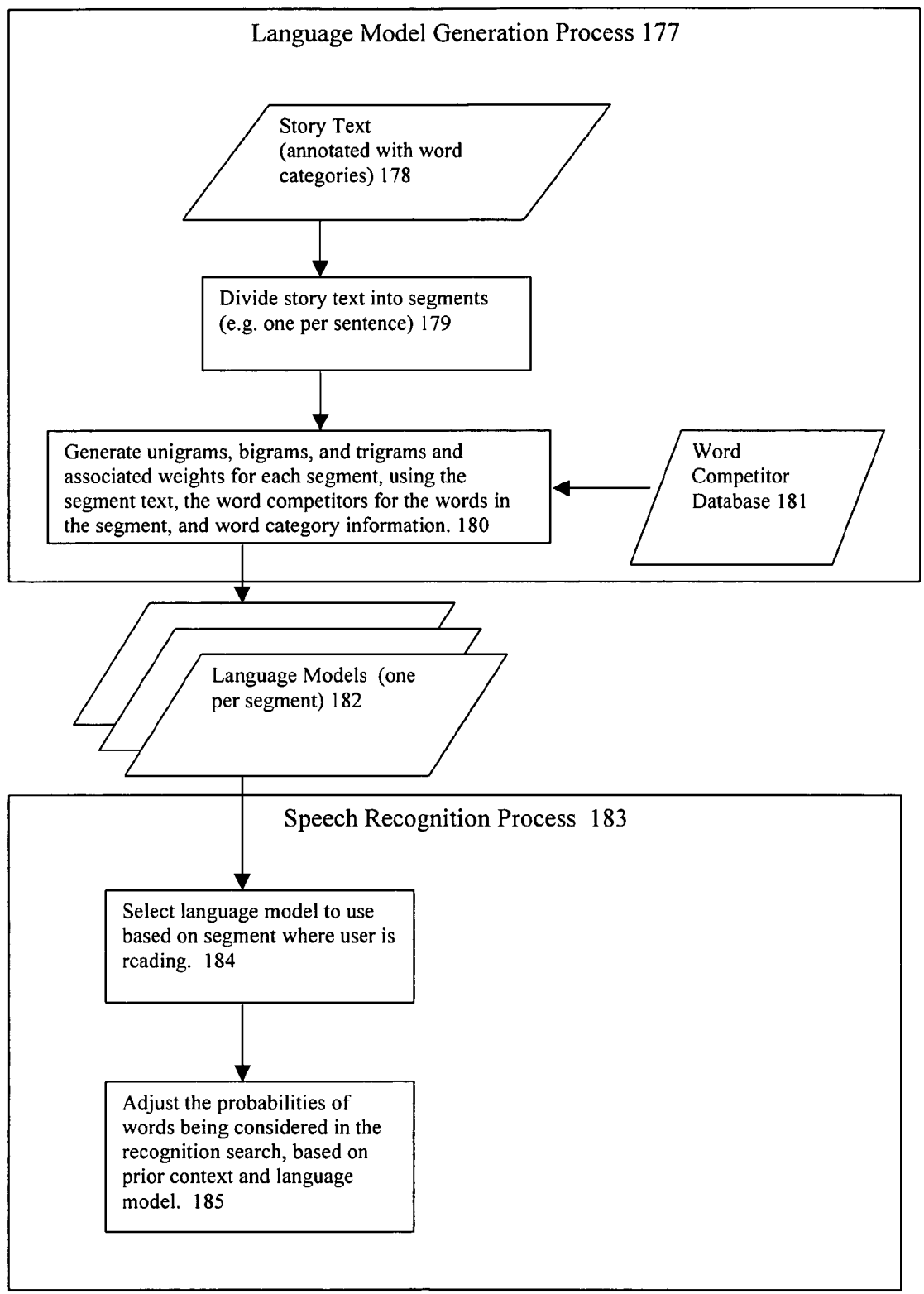
FIG. 9 is a flow chart of environmental weighting for a word based on a reader's location in a passage.

Referring to FIG. 9, the language model generation process 177 takes the current text 178 that the user is reading and divides it into segments 179. In one embodiment, each segment includes the words in a single sentence and one or more words from the following sentence. In other implementations, the segment could be based on other units such as paragraph, a page of text, or a phrase. The unigram, bigram, and trigram word sequences and corresponding weights are defined 180 based on the sequence of words in the sentence, and the word competition models for those words. The language model generation process uses rules about which words in the sentence may be skipped or not recognized in oral reading (based on word category). The speech recognition process selects the language model to use based on where the user is reading in the text 186 (e.g., the process selects the language model for the current sentence). The recognition process adjusts the probability or score of recognition alternatives currently being considered in the recognition search based on the language model 185. Once the user starts an utterance, the "prior context" used by the language model to determine weightings comes from recognition alternatives for the utterance up until that point. For example, if the sentence is "The cat sat on the mat" and a recognition alternative for the first part of the utterance is "The cat", then the weightings provided by the language model will typically prefer a recognition for "sat" as the next word over other words in the sentence.

At the very start of the utterance however, no prior context from the recognizer is yet available. In this case, the tutor software uses the prior context based on where the user was in the text at the start of this utterance. This "initial recognition context" information is also included in the language model. Therefore, if the user just received an intervention on "sat" and is therefore starting an utterance with that word, the initial recognition context of "the cat" (the preceding text words) will mean that the weightings applied will prefer recognition for "sat" as the first word of the utterance.

There are multiple ways that the recognizer configuration is dynamically changed to adjust to both the current text that is being read, and the current user. The language model 64 is sentence-based and is switched dynamically 186 each time the user enters a new sentence. The "initial recognition context" is based on the precise point in the text where the current utterance was started. In addition, the "pronunciation correctness slider" can control many aspects of the relative weighting of recognition items, as well as the content of the language model, and this setting can be changed either by the user or by the teacher during operation. Weightings or other aspects of recognition configuration that can be controlled include the relative weighting of sequences including word competition models in the language model, the relative weighting of word sequences which are explicitly in the language model (represented in bigrams and trigrams) vs. sequences which are not, and the content of the language model. The content of the language model is chosen based on how competition models are generated, what word sequences are explicitly in the language model and how s/he are weighted relative to one another. The "pronunciation correctness slider" setting may also control the relative weighting of silence, noise, or phoneme filler sequences vs. other recognition items.

In the current implementation, the language model includes the words in the current sentence and one or more words from the subsequent sentence (up to and including the first non-glue word in the subsequent sentence). The subsequent sentence words are included to help the tutor software 34 determine when the user has transitioned from the current sentence into the next sentence, especially in cases where the reader does not pause between sentences.

Figure 10:
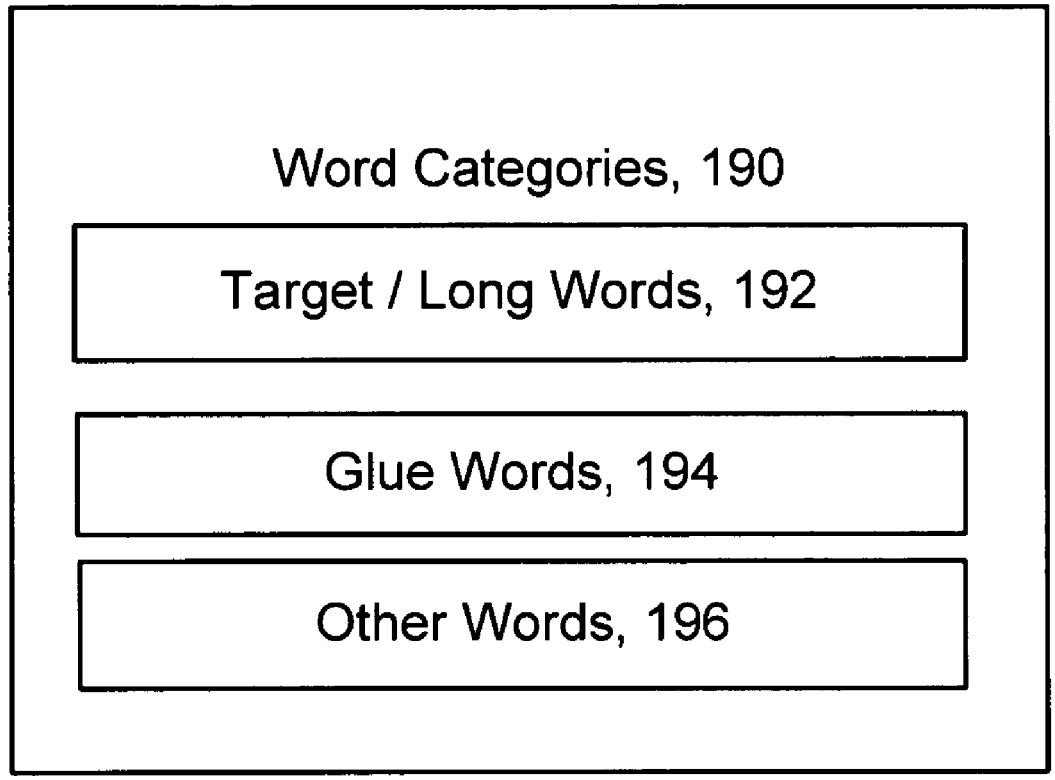
FIG. 10 is a block diagram of word categories.

Referring to FIG. 10, a set of word classifications or categories 190 is shown. The word categories can have different settings in the speech recognition and tutor software 34. The settings can be used to focus on particular words or sets of words in a passage. Word categories 190 include target words 192, glue words 194, and other words 196. Words in a passage or story are segmented into one or more of these categories or other word categories according to his or her type as described below. Based on the category, the acoustic match confidence score may be used to determine the color coding of the word and whether the word is placed on a review list. For example, if the passage is focusing on a particular set of words to expand the student's vocabulary, a higher acoustic confidence match score may be required for the words in the set.

Glue words 194 include common words that are expected to be known by the student or reader at a particular level. The glue words 194 can include prepositions, articles, pronouns, helping verbs, conjunctions, and other standard/common words. A list of common glue words 194 is shown in FIG. 11. Since the glue words 194 are expected to be very familiar to the student, the tutor software and speech recognition engine may not require a strict acoustic match confidence on the glue words 194. In some examples, the software may not require any recognition for the glue words 194. The relaxed or lenient treatment of glue words 194 allows the reader to focus on the passage and not be penalized or interrupted by an intervention if a glue word is read quickly, indistinctly, or skipped entirely.

Target words 192 also can be treated differently than other words in the passage. Target words 192 are the words that add content to the story or are the new vocabulary for a passage. Since the target words are key words in the passage, the acoustic match confidence required for the target words 192 can be greater than for non-target words. Also, the word competition models may be constructed or weighted differently for target words. In addition, the target words 192 may be further divided into multiple sub-classifications, each sub-classification requiring different treatment by the speech recognizer and the tutoring software.

Additional word categories may also be defined, such as a category consisting of words which the user has mastered based on the user's past reading history. For example, the time gap measurement may not be used to color code words or place words on the review list if the words are in the mastered word category. Instead, if the time gap measurement for the mastered word exceeds a threshold, it will be used as an indication that the user struggled with a different word in the sentence or with the overall interpretation of the sentence.

Words in a text can be assigned to a word category based on word lists. For example, words can be assigned to the glue word category if the are on a list such as the common glue word list (FIG. 11), assigned to the mastered word category if s/he are on a list of words already mastered by that user, and assigned to a target word category if s/he are in a glossary of new vocabulary for a passage. However, to be more effective, word categorization can also take into account additional factors such as the importance of a word to the meaning of a particular sentence, the lesson focus, and the reading level of the user and of the text. Therefore a word may be assigned to a particular category (e.g. the glue word category) in one sentence or instance, and the same word may assigned to a different category in another sentence or instance, even within the same text.

Figure 12A:
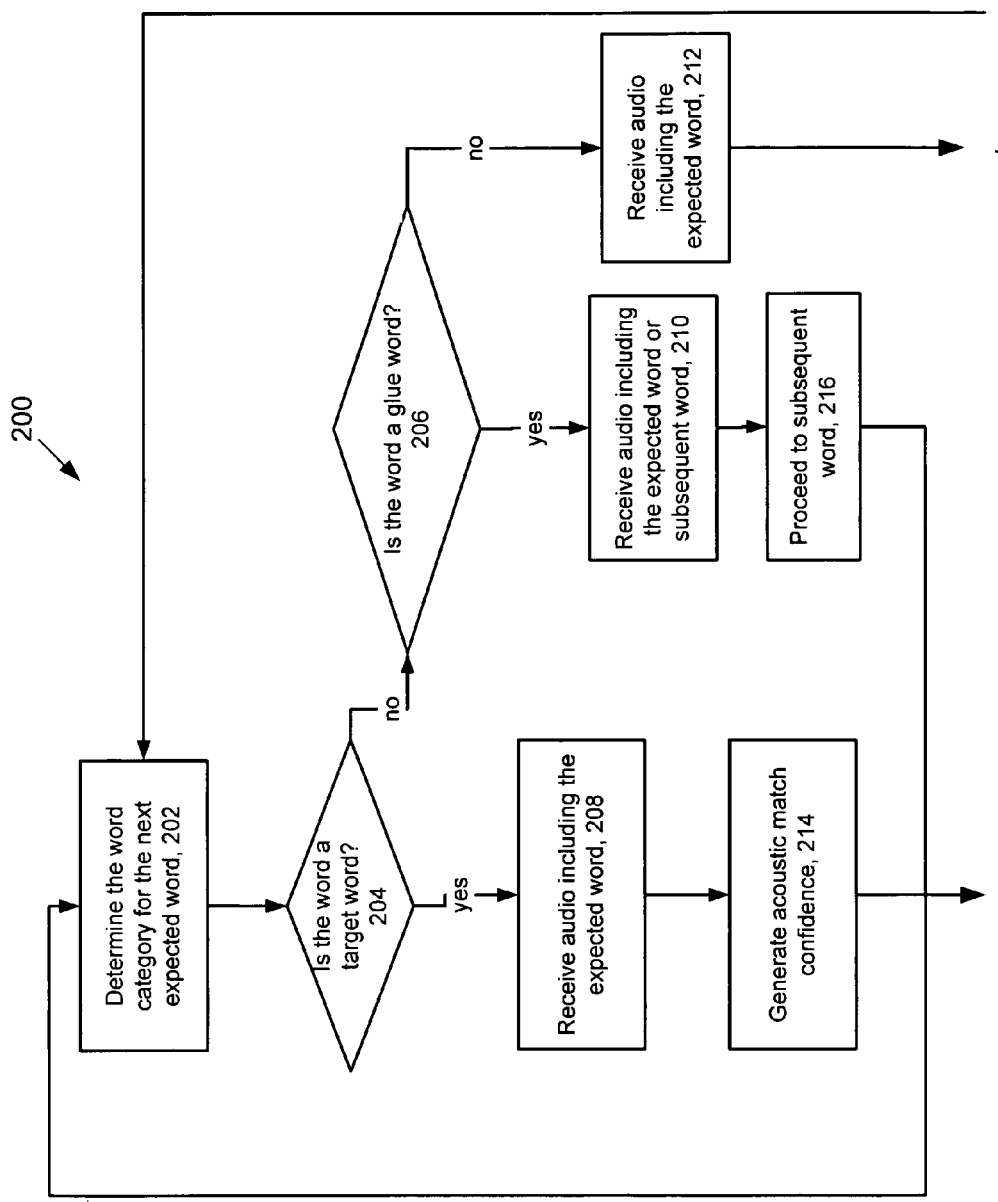
FIGS. 12A and 12B are portions of a flow chart of a process using word categories to assess fluency.
Figure 12B:
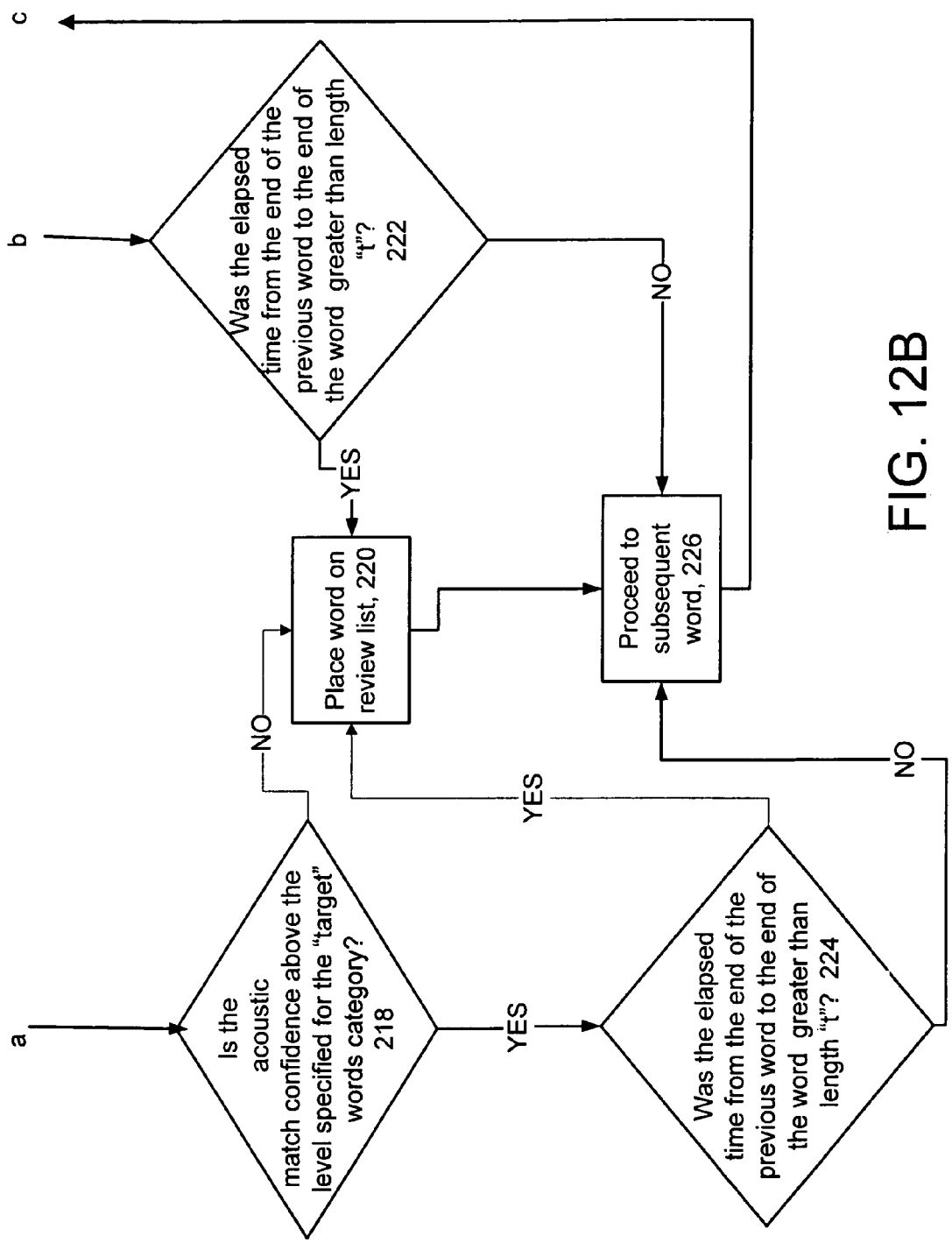

Referring to FIG. 12, a process 200 related to the progression of a reader through a story is shown. For the location of the user within the story, the speech recognition software determines 202 the word category for the next or subsequent word in the passage. The speech recognition software determines 204 if the word is a target word.

The speech recognition software 32 receives 208 audio from the user and generates a recognition sequence corresponding to the audio. If a valid recognition for an expected word is not received, the software will follow the intervention processes outlined above, unless the word is a glue word. If the word is a glue word, a valid recognition may not be required for the word. In this example, the speech recognition software receives 210 audio input including the expected glue word or a subsequent word and proceeds 216 to a subsequent word.

If a valid recognition for the expected word is received, and the word is not a glue word, the tutor software analyzes additional information obtained from the speech recognition sequence. The software measures 222 and 224 if there was a time gap exceeding a predetermined length prior to or surrounding the expected word. If there is such a time gap, the word is placed 220 on a review list and coded a color to indicate that it was not read fluently. Typically this color is a different color from that used for 'correct' words (e.g. green), and also different from the color used to code words that have received an audio intervention (e.g. red). In addition, if the word is a target word, the software analyzes the acoustic match confidence 214 that has been generated for the word.

The acoustic match confidence is used to determine if the audio received from the user matches the expected input (as represented by the acoustic model for that word) closely enough to be considered as a correct pronunciation. The speech recognition software determines 218 if the acoustic match confidence for the particular target word is above a predefined level. If the match confidence is not above the level, the word is placed on a review list 220 and coded a color to indicate that it was not read correctly or fluently. After determining the coding of the word, the tutor software 34 proceeds 226 to the subsequent word.

While in the above example, only target words were evaluated using acoustic match confidence, other words in the glue word category or other word category could also be evaluated using acoustic match confidence. The implementation of word categories may include additional different treatment of words and may include more or fewer word categories 190. In addition, the treatment of different categories of words can be controlled dynamically at the time the software is run. As described above, the tutor software 34 generates a list of review words based on the student's reading of the passage. A word may also be placed on the review list for reasons not directly related to the student's reading of the passage, for example if the student requested a definition of the word from the tutor software, the word could be placed on the review list. The review list can include one or more classifications of words on the review list and words can be placed onto the review list for multiple reasons. The review list can be beneficial to the student or to an administrator or teacher for providing feedback related to the level of fluency and specific difficulties for a particular passage. The review list can be used in addition to other fluency assessment indications such as number of total interventions per passage or words per minute. In some embodiments, the list of review words can be color-coded (or distinguished using another visual indication such as a table) based on the reason the word was included in the review list. For example, words can be included in the review list if an acoustic match confidence for the word was below a set value or if the user struggled to say the word (e.g., there was a long pause prior to the word). Words can also be placed on the review list if the user received a full audio intervention for the word (e.g., if the tutor software did not receive a valid recognition for the word in a set time, or the user requested an audio intervention for that word). Words that have been included on the review list due an audio intervention can be color coded in a one color while words placed on the review list based on the analysis of a valid recognition for the word (either time gaps associated with the word, or acoustic match confidence measurements) can be color coded in a second color.

Figure 13:
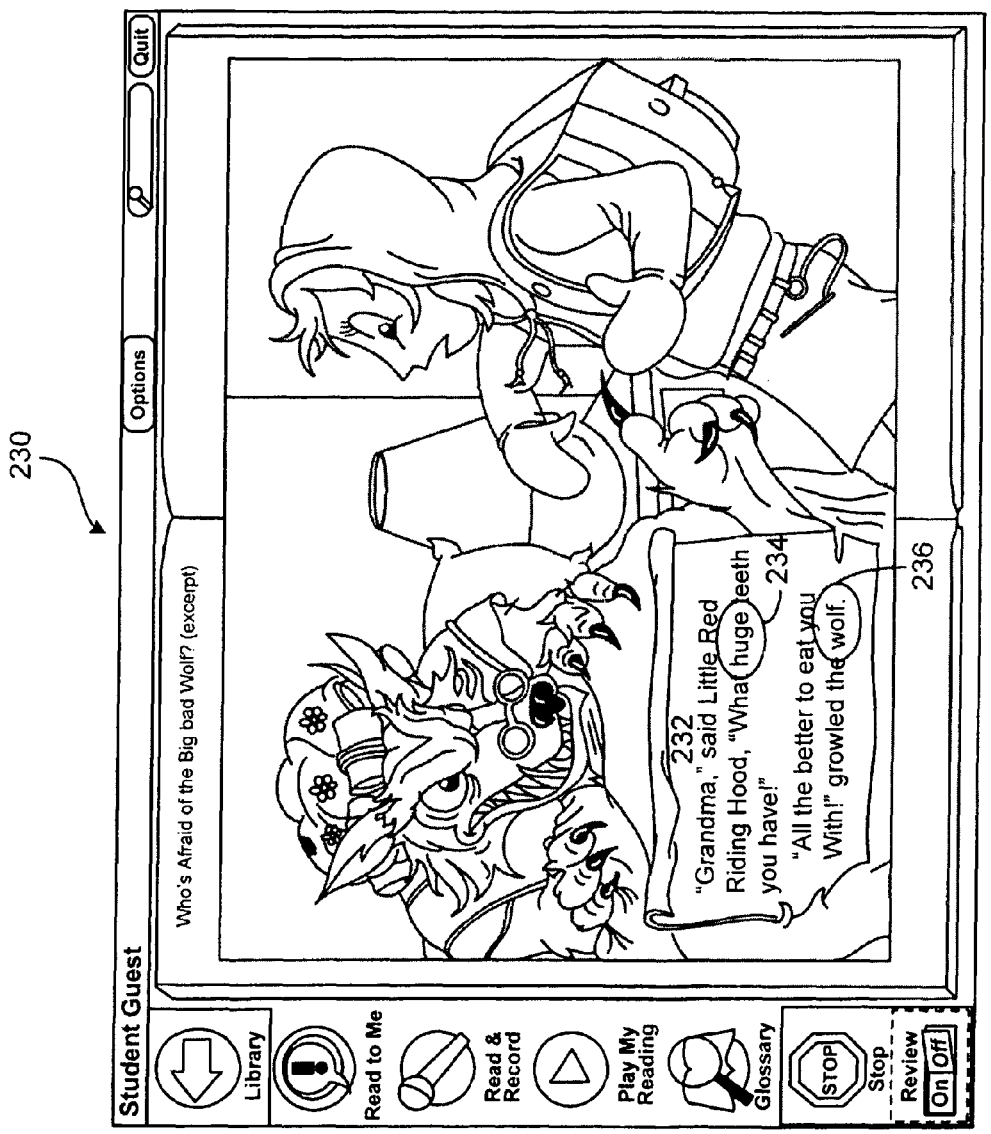
FIG. 13 is a screenshot of a passage.

Referring to FIG. 13, in addition to color coding words on a review list, the words can also be color coded directly in the passage as the student is reading the passage. For example, in passage 323 shown on screenshot 230 the word 234 'huge' is coded in a different manner than the word 236 'wolf.' The first color-coding on word 234 is related to a pause exhibited in the audio input between the word 'what' and the word 'huge'. The second color-coding on word 236 is related to the user receiving an audio intervention for the word 236. Both words 234 and 236 would also be included on a list of review words for the user.

While the language models and sentence tracking have been described above based on a sentence, other division points within a passage could be used. For example, the language models and sentence-by-sentence tracking could be applied to sentence fragments as well as to complete sentences. For example, s/he could use phrases or lines as the "sentence." For example, line-by-line type sentence-by-sentence tracking can be useful to promote fluency in poetry reading. In addition, tracking sentences by clauses or phrases can allow long sentences to be divided and understood in more manageable linguistic units by the user. In some embodiments, single words may be used as the unit of tracking. Furthermore, the unit of tracking and visual feedback need not be the same as the unit of text used for creating the language models. For example, the language models could be based on a complete sentence whereas the tracking could be phrase-by-phrase or word-by-word.

A number of embodiments of the invention have been described. Nevertheless, it will be understood that various modifications may be made without departing from the spirit and scope of the invention. For example, the system can provide support to people who are learning to read a second language. The system can support people who are learning to read in a language other than English, whether as a first or second language. The system can have a built-in dictionary that will explain a word's meaning as it is used in the text. The built-in dictionary can provide information about a word's meaning and usage in more than one language including, for example, the language of the text and the primary language of the user. Accordingly, other embodiments are within the scope of the following claims.

What is claimed is:

1. A computer-based method comprising:

receiving by a computer audio input associated with a user reading a sequence of words displayed on a graphical user interface generated from the computer, with words in the sequence of words associated with at least one pre-assigned word category;

assessing by the computer a level of fluency and pronunciation accuracy of the reading by the user of the sequence of words by:

applying the audio input to a speech recognition engine, configured to produce an output, as a sequence of recognized words, corresponding to the received input;

comparing the sequence of recognized words to an expected sequence of words; and providing by the computer feedback to the user related to the level of fluency and pronunciation accuracy for a word in the sequence of recognized words, wherein providing the feedback includes:

(a) providing immediate feedback comprising one or more of a visual intervention that includes visual indications provided on the graphical user interface and an audio intervention that includes an audio indication if the level of fluency and pronunciation accuracy for a word in the sequence of recognized words does not meet a first set of criteria;

(b) placing words on a review list if the level of fluency and pronunciation accuracy for a word in the sequence of recognized words meets the first set of criteria, but does not meet a second set of criteria;

(c) placing words on a review list if immediate feedback was given for the word in the sequence of recognized words, depending on the word's category and type of immediate feedback previously given;

(d) providing deferred feedback by concurrently presenting a plurality of words from the review list to the user;

wherein the computer-based method is executed by a processor in a computer system.

2. The method of claim 1 wherein providing deferred feedback further comprises:

providing feedback based on an elapsed time before, during, and/or after the output is recognized as a word.

3. The method of claim 1 wherein the criteria for providing immediate and deferred feedback for a word are dependent on the word's category.

4. The method of claim 1, wherein the immediate feedback is a visual intervention that includes visual indications provided on the graphical user interface, and which does not include an audio indication.

5. The method of claim 4 wherein the visual indications comprises highlighting the word on the graphical user interface.

6. The method of claim 4 wherein the visual indications comprise:
coloring the text prior to the word in the sequence of recognized words in a first color; and
coloring the word and text subsequent to the word in the sequence of recognized words in a second color, the first color being different from the second color.

7. The method of claim 1, wherein the audio indication comprises a pronunciation of the word.

8. The method of claim 1, wherein a visual intervention is provided based on a first attempt by the user to read a word and an audio intervention is provided based on a second attempt by the user to read the word.

9. The method of claim 8 further comprising:
providing the user a third opportunity to read the word subsequent to the audio intervention; and
providing a visual indication on the graphical user interface to indicate that the user should continue reading with the subsequent word if the level of fluency and pronunciation accuracy criteria for the word does not meet a third set of criteria.

10. The method of claim 1 wherein the deferred feedback comprises coloring the sequence of words read by the user using different colors on the graphical user interface.

11. The method of claim 10 further comprising:
providing a color based indication for words meeting both sets of fluency and pronunciation accuracy criteria using a first color;
providing a color based indication for words receiving an audio intervention using a second color; and
providing a color based indication for words not receiving an audio intervention and not meeting the second set of criteria using a third color.

12. The method of claim 11 further comprising providing a color based indication for words which received a visual intervention, but not an audio intervention, using the third color.

13. The method of claim 1 wherein words receiving an audio intervention are placed on a review list.

14. The method of claim 1 wherein words receiving a visual intervention are placed on a review list.

15. The method of claim 1 further comprising assessing the fluency and pronunciation accuracy of the reading by the user on a word-by-word basis, including:
generating user statistics and performance measurements for both progress reporting and dynamic adjustment of the tutoring software settings for the user;
generating lists of words which the user has mastered;
measuring the base or "trouble-free" reading rate for the user.

16. A computer program product residing on a non-transitory computer readable medium comprising instructions for causing an electrical device to:
receive audio input associated with a user reading a sequence of words displayed on a graphical user interface, with at least one of the words in the sequence of words associated with a pre-assigned word category;
assess a level of fluency and pronunciation accuracy of the reading by the user of the sequence of words by:
applying the audio input to a speech recognition engine, configured to produce an output, as a sequence of recognized words, corresponding to the received input;
comparing the sequence of recognized words to an expected sequence of words; and
providing feedback to the user related to the level of fluency and pronunciation accuracy for a word in the sequence of recognized words, wherein providing the feedback includes:
(a) providing immediate feedback comprising one or more of a visual intervention that includes visual indications provided on the graphical user interface and an audio intervention if the level of fluency and pronunciation accuracy for a word in the sequence of recognized words does not meet a first set of criteria;
(b) placing words on a review list if the level of fluency and pronunciation accuracy for a word in the sequence of recognized words meets the first set of criteria, but does not meet a second set of criteria;
(c) placing words on a review list if immediate feedback was given for the word in the sequence of recognized words, depending on the word's category and type of immediate feedback previously given; and
(d) providing deferred feedback by concurrently presenting a plurality of words from the review list to the user.

17. The computer program product of claim 16 wherein the immediate feedback is a visual intervention that includes visual indications provided on the graphical user interface, and which does not include an audio indication.

18. The computer program product of claim 16 further comprising instructions for causing an electrical device to:
color the text prior to the word in the sequence of recognized words in a first color; and
color the word and text subsequent to the word in the sequence of recognized words in a second color, the first color being different from the second color.

19. The computer program product of claim 16 wherein a visual intervention is provided based on a first attempt by the user to read a word and an audio intervention is provided based on a second attempt by the user to read the word.

20. The computer program product of claim 16 further comprising instructions for causing an electrical device to:
provide a color based indication for words meeting both sets of fluency and pronunciation accuracy criteria using a first color;
provide a color based indication for words receiving an audio intervention using a second color; and
provide a color based indication for words not receiving an audio intervention and did not meet the second set of criteria using a third color.

21. The computer program product of claim 16 wherein words receiving an audio intervention are placed on a review list.

22. The computer program product of claim 16 wherein words receiving a visual intervention are placed on a review list.

23. An apparatus comprising:
a processor; and
an input device;
wherein:
the input device is configured to receive audio input associated with a user reading a sequence of words displayed on a graphical user interface, with at least one word in the sequence of words associated with a pre-assigned word category;

the processor is configured to assess a level of fluency and pronunciation accuracy of the reading by the user of the sequence of words by:
applying the audio input to a speech recognition engine, configured to produce an output, as a sequence of recognized words, corresponding to the received input; and
comparing the sequence of recognized words to an expected sequence of words; and
the processor is further configured to provide feedback to the user related to the level of fluency and pronunciation accuracy for a word in the sequence of recognized words, with providing feedback comprising:
providing immediate feedback comprising one or more of a visual intervention that includes visual indications provided on the graphical user interface and an audio intervention if the level of fluency and pronunciation accuracy for a word in the sequence of recognized words does not meet a first set of criteria;
placing words on a review list if the level of fluency and pronunciation accuracy for a word in the sequence of recognized words meets the first set of criteria, but does not meet a second set of criteria;
placing words on a review list if immediate feedback was given for the word in the sequence of recognized words, depending on the word's category and type of immediate feedback previously given; and
providing deferred feedback by concurrently presenting a plurality of words from the review list to the user.

24. The apparatus of claim 23 further configured to:
color the text prior to the word in the sequence of recognized words in a first color; and
color the word and text subsequent to the word in the sequence of recognized words in a second color, the first color being different from the second color.

25. The apparatus of claim 23 further configured to:
provide a color based indication for words meeting both sets of fluency and pronunciation accuracy criteria using a first color;
provide a color based indication for words receiving an audio intervention using a second color; and
provide a color based indication for words not receiving an audio intervention and did not meet the second set of criteria using a third color.

26. The apparatus of claim 23 further configured to place words on a review list based on an audio or visual intervention.

27. The apparatus of claim 23 further configured to generate review exercises for the user based on the review list.

28. The method of claim 1, wherein:
providing the immediate feedback if the level of fluency and pronunciation accuracy for a word in the sequence of recognized words does not meet a first set of criteria comprises providing one or more of an audio intervention that includes an audio indication and providing a visual intervention that includes a visual indication provided on the graphical user interface;
providing the deferred feedback to the user if the level of fluency and pronunciation accuracy for a word in the sequence of recognized words meets the first set of criteria, but does not meet a second set of fluency and pronunciation accuracy criteria comprises placing a word on a review list if the received audio for the word if the level of fluency and accuracy for the word indicated a correct pronunciation of the word but a time between receiving a correct pronunciation exceeded a threshold length of time; and
providing the deferred feedback to the user if immediate feedback was given for the word in the sequence of recognized words, depending on the word's category and type of immediate feedback previously given comprises placing a word on a review list if an audio or visual intervention was provided for the word and the word is in a particular category of words.

29. A computer-based method comprising:
receiving by a computer audio input associated with a user reading a sequence of words displayed on a graphical user interface generated from the computer, with words in the sequence of words associated with at least one pre-assigned word category;
assessing by the computer a level of fluency and pronunciation accuracy of the reading by the user of the sequence of words by:
applying the audio input to a speech recognition engine, configured to produce an output, as a sequence of recognized words, corresponding to the received input;
comparing the sequence of recognized words to an expected sequence of words; and
providing by the computer feedback to the user related to the level of fluency and pronunciation accuracy for a word in the sequence of recognized words, wherein providing the feedback includes:
(a) providing, based on a first attempt by the user to read a word, a visual intervention that includes a visual indication provided on the graphical user interface if the level of fluency and pronunciation accuracy for a word in the sequence of recognized words does not meet a first set of criteria,
(b) providing, based on a second attempt by the user to read a word, an audio intervention that includes an audio indication if the level of fluency and pronunciation accuracy for a word in the sequence of recognized words does not meet the first set of criteria;
(c) placing a word on a review list if the level of fluency and pronunciation accuracy for a word in the sequence of recognized words meets the first set of criteria, but does not meet a second set of criteria;
(d) placing a word on the review list if immediate feedback was given for the word in the sequence of recognized words, depending on the word's category and type of immediate feedback previously given; and
(e) providing deferred feedback by concurrently presenting a plurality of words from the review list to the user;
wherein the computer-based method is executed by a processor in a computer system.

* * * * *